United States Patent
Kumada et al.

(10) Patent No.: US 6,843,887 B2
(45) Date of Patent: Jan. 18, 2005

(54) LOW HYGROSCOPIC PAPER AND METHOD OF PRODUCING THE SAME

(75) Inventors: Hiroaki Kumada, Inashiki-gun (JP); Takanari Yamaguchi, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 316 days.

(21) Appl. No.: 10/101,614

(22) Filed: Mar. 21, 2002

(65) Prior Publication Data

US 2002/0153111 A1 Oct. 24, 2002

(30) Foreign Application Priority Data

Mar. 23, 2001 (JP) .................................... 2001-084450
Apr. 26, 2001 (JP) .................................... 2001-129291

(51) Int. Cl.$^7$ ............................................. D21H 13/10

(52) U.S. Cl. ............... 162/146; 162/157.3; 162/168.1; 162/168.2

(58) Field of Search ............................. 162/146, 157.3, 162/168.2, 168.1

(56) References Cited

U.S. PATENT DOCUMENTS

| 4,876,120 A | 10/1989 | Belke et al. |
| 5,454,910 A | 10/1995 | Yoon et al. |
| 5,851,604 A | 12/1998 | Muller-Rees et al. |

FOREIGN PATENT DOCUMENTS

| DE | 19922158 A1 | 11/2000 |
| EP | 0 167 682 A1 | 1/1986 |
| EP | 0 686 726 A2 | 12/1995 |
| EP | 0 930 393 A1 | 7/1999 |
| JP | 09021089 | 1/1997 |
| JP | 11117184 | 4/1999 |

*Primary Examiner*—Peter Chin
(74) *Attorney, Agent, or Firm*—Birch, Stewart, Kolasch & Birch, LLP

(57) ABSTRACT

Provided is low hygroscopic paper obtainable by heat-pressing composite paper comprising a pulp component and/or fiber component and, a liquid crystal polymer filler component made of a liquid crystal polymer exhibiting optical anisotropy in molten state, at a temperature higher than the flow initiation temperature of said liquid crystal polymer by 30° C. or more. The low hygroscopic paper has also excellent machanical strength and heat resistance, and can be used as a substrate paper such as a prepreg particularly useful for electric and electronic circuit boards.

14 Claims, No Drawings

LOW HYGROSCOPIC PAPER AND METHOD OF PRODUCING THE SAME

BACKGROUND OF THE INVENTION

1. Field of the Invention

The present invention relates to low hygroscopic paper, more specifically, to low hygroscopic paper comprising a pulp component and/or fiber component and, a liquid crystal polymer filler component made of a liquid crystal polymer exhibiting optical anisotropy in molten state.

2. Description of the Related Art

Paper is used in a lot of applications such as electric insulation uses, prepreg substrate paper, filter materials and the like, and conventionally, pulps and fibers of aromatic polyamide, cellulose, polyolefin and the like are used.

However, when paper materials derived from aromatic polyamide and cellulose are used, since these material themselves have high hygroscopicity, the resulted paper also show high hygroscopicity, particularly, in the electric and electronic fields, hygroscopicity is required to be reduced.

On the other hand, there is disclosed a heat-resistant paper obtained by heat-pressing composite paper comprising a pulp component and/or fiber component made of cellulose, aromatic polyamide and the like and, a liquid crystal polymer filler component made of a liquid crystal polymer exhibiting optical anisotropy in molten state, at a temperature near the flow initiation temperature of the above-mentioned liquid crystal polymer (JP-A No. 9-21089).

However, this heat-resistant paper also has a problem of manifesting hygroscopicity arising from raw materials.

Under such conditions, the present inventors have intensively investigated to provide low hygroscopic paper in which hygroscopicity arising from raw materials is reduced, and resultantly, found that low hygroscopic paper having an excellently lower moisture absorption rate than expected from additivity of raw materials is unexpectedly obtained by heat-pressing composite paper which comprises a pulp component and/or fiber component and, a liquid crystal polymer filler component, at a specific temperature, leading to completion of the invention.

SUMMARY OF THE INVENTION

Namely, the present invention provide low hygroscopic paper obtained by heat-pressing composite paper which comprises a pulp component and/or fiber component and, a liquid crystal polymer filler component made of a liquid crystal polymer exhibiting optical anisotropy in molten state, at a temperature higher than the flow initiation temperature of said liquid crystal polymer by 30° C. or more. The present invention also provides a branched liquid crystal polymer filler useful as a component of liquid crystal polymer filler.

DETAILED DESCRIPTION OF THE INVENTION

The low hygroscopic paper of the present invention is obtained by heat-pressing composite paper which comprises a pulp component and/or fiber component and, a liquid crystal polymer filler component made of a liquid crystal polymer exhibiting optical anisotropy in molten state, and it is necessary that the heat press temperature is higher than the flow initiation temperature of the above-mentioned liquid crystal polymer by 30° C. or more. The preferable heat press temperature is higher than the flow initiation temperature of the above-mentioned liquid crystal polymer by 30° C. to 200° C. More preferably, the heat press temperature is higher than the flow initiation temperature of the above-mentioned liquid crystal polymer by 35° C. to 100° C. When the heat press temperature is lower than a temperature of 30° C. higher than the flow initiation temperature of the above-mentioned liquid crystal polymer, hygroscopicity arising from raw materials is manifested and hygroscopic paper having a lower moisture absorption rate than expected from additivity of raw materials is not obtained, on the other hand, when the heat press temperature is too high, decomposition of raw materials is caused, undesirably.

Here, the flow initiation temperature means a temperature (° C.) at which the melt viscosity is 48000 poise when a resin heat-melted at a temperature rising rate of 4° C./min is extruded through a nozzle having an internal diameter of 1 mm and a length of 10 mm under a load of 100 kg/cm$^2$, using a flow tester, CFT-500 type, manufactured by Shimadzu Corp.

As the composite paper which is to be heat-pressed, those containing a liquid crystal polymer filler in an amount of usually 1% by weight or more and less than 60% by weight based on the total amount of a liquid crystal polymer filler and a pulp component and/or fiber component are used. This amount is preferably 3% by weight or more and less than 50% by weight, more preferably 5% by weight or more and less than 40% by weight. When the amount of a liquid crystal polymer is too small, the effect of reducing moisture absorption rate tends to lower, and when too large, the strength of the resulted paper tends to low, namely, either case is not preferable.

The method of producing such composite paper is not particularly restricted, and usually, those made from paper materials comprising a pulp component and/or fiber component and, a liquid crystal polymer filler component made of a liquid crystal polymer exhibiting optical anisotropy in molten state, are used.

Here, though the pulp component and fiber component are not particularly restricted, it is preferable to use those having high moisture absorption rate, in view of affinity with water in paper making, and the like, and for example, this moisture absorption rate is preferably over 0.3%, more preferably over 1%. Particularly, it is preferable to use those having a moisture absorption rate of 3% or more.

As the preferable pulp component and fiber component in the present invention, for example, pulps and fibers made of cellulose (wood pulp), aromatic polyamide, nylon, aromatic polyimide, aromatic polyamideimide, phenol fiber, flame retardant polyacrylonitrile, poly p-phenylenebenzobisoxazole and the like, mixtures of two or more of them, and the like, are listed. Of them, pulp and fiber made of aromatic polyamide are preferably used.

The form of a liquid crystal polymer filler component made of a liquid crystal polymer exhibiting optical anisotropy in molten state is not particularly restricted, and this component preferably has a trunk part in the form of flat plate, and further preferably has a trunk part and branching parts extending from the trunk part. In view of uniform dispersibility with fiber and/or pulp in preparation of a paper material, the specific surface area of the liquid crystal polymer filler component is preferably from 0.01 to 2.5 m$^2$/g, more preferably from 0.1 to 2.0 m$^2$/g.

The thickness of a liquid crystal polymer filler is from 0.3 to 30 μm, and preferably from 0.5 to 15 μm. The thickness is further preferably from 1 to 10 μm. When the thickness is too small, fillers tend to aggregate mutually, and when too large, projections and extraneous materials as dirt are formed in the composite paper, undesirably. The liquid crystal polymer filler has a form of a trunk part and branching parts extending from the trunk part, and preferably has a trunk part in flattened form. According to the flat plate form of the trunk part, it become easy to coat the surface of pulp component and/or fiber component by heat treating to prevent moisture absorption, and it is preferable. Furthermore, existence of the branching parts improve the compatibility of the liquid crystal polymer filler with pulp component and/or fiber component in paper making.

The method of producing a liquid crystal polymer filler in the present invention is also not particularly restricted, and it is preferable to produce the filler by pulverizing a film made of a liquid crystal polymer. By using the film, the trunk part in a filler can be maintained easily in flattened form and the thickness of the flattened trunk part can be controlled easily. For example, when fiber, pellet and powder are ground, the thickness and particle size become ununiform in some cases, however, in the case of a film, the thickness of the trunk part in the form of flat plate does not exceed the thickness of a film, preferably. Further, in the case of a film, the thickness can be decreased by increasing drawing ratio, and production of extraneous materials such as dirt and the like in making composite paper can be prevented.

The method of pulverizing is also not particularly restricted, and a beating method is preferably used. For mechanical pulverizing, various grinders, mills, beaters, jordans, refiners and the like, for example, are effectively used. In the case of beating operation under wet condition, it is also possible to use water, oil solution and surfactant for the purpose of preventing fusion of raw material resins. It is also possible to add alcohols such as isopropanol, ethanol and the like to enhance the wettability of the surface and make progress of crushing more easy. Pulverizing progresses easily if the length of either MD or TD is previously cut into a size of 0.1 mm to 50 mm, further preferably, about 0.5 mm to 20 mm.

Further, the method of producing a film used for pulverizing also is not particularly restricted, and there can be used, for example, films or sheets obtained a T die method of extruding and winding a molten resin from a T die and an inflation film formation method of extruding a molten resin in the form of cylinder from an extruder equipped with an annular dice and cooling and winding the extruder resin, films or sheets obtained by a heat press method or solvent cast method, and films or sheets obtained by mono-axially drawing or bi-axially drawing a sheet obtained by an injection molding method and extrusion method, and it is preferable that fiber is not formed easily, for formation of a trunk part in the form of flat plate, therefore, it is preferable to use a film obtained by bi-axially drawing.

Here, as the bi-axial drawing method, an inflation method in which a molten body extruded from a die in the form of cylinder is expanded by a gas or tension is added to the surface of the molten resin even if expansion is not effected, is most preferably used.

In the inflation method, a liquid crystal polymer, for example, is fed into a melt-extruder equipped with a die having an annular slit, and the polymer is melt-extruded at a cylinder setting temperature of from 200 to 380° C., preferably from 230 to 360° C., and a molten resin in the form of cylindrical film is extruder toward upper direction or lower direction from an annular slit of the extruder. The annular slit distance is usually from 0.1 to 5 mm, preferably from 0.2 to 2 mm, and the diameter of the annular slit is usually from 20 to 1000 mm, preferably from 25 to 600 mm. The melt-extruded molten resin film is drawn along the longitudinal direction (MD: machine direction), and simultaneously, air or an inert gas, for example, a nitrogen gas or the like is blown into this cylindrical film, thus the film can be expansion-drawn along the transverse direction (TD) vertical to the longitudinal direction. Also when the diameter of the cylindrical film is smaller than the diameter of the annual slit, blowing of a gas into the film can give tension so that the cylindrical film is not shrunk or contracted or wrinkled needlessly.

In the inflation molding method, the preferable blow ratio is over 1.0 and not more than 15, more preferably not less than 1.2 and not more than 10. When the blow ratio is more than 15, thickness of the obtained film tends to become uneven, and it is not preferable. The preferable MD elongation ratio is over 1.5 and not more than 70. When it is not more than 1.5, branching may not occur in a filler when the resulted film is ground, undesirably, and when not less than 70, a film formation may be difficult, undesirably. Here, the blow ratio means a value obtained by dividing the diameter of a molten resin after discharged from a dice port and expanded by the diameter of an annular slit. The MD elongation ratio means a value obtained by dividing the film pulling speed by the discharging speed of a resin from an annular slit.

The expanded molten resin film can be pulled through nip rolls, after air cooling or water cooling of the periphery. For inflation film forming, conditions which make the cylindrical molten film to expand with having a uniform thickness and smooth surface.

The thickness of the film is preferably from 0.5 to 15 μm. When a film material is obtained as a raw material for pulverizing, the thickness is not particularly restricted, but preferably from 0.5 to 100 μm, more preferably from 1 to 30 μm, further preferably from 3 to 10 μm.

In the present invention, a liquid crystal polymer filler component made of a liquid crystal polymer exhibiting optical anisotropy in molten state as above is used. Examples of the liquid crystal polymer exhibiting optical anisotropy in molten state include: polyesters of wholly aromatic type or partially aromatic type, polyester imides, polyester amides, and resin compositions comprising thereof, etc. In the present invention, a liquid crystal polyester or a resin composition thereof can be used suitably, and a wholly aromatic liquid crystal polyester and a resin composition thereof are more suitable. Further, it is suitable to use a liquid crystal polymer that produces a filler having a continuously usable heat resistant temperature of 140° C. or more.

The liquid crystal polyester used in the present invention is a polyester called "thermotropic liquid crystal polymers". More specifically, examples thereof include:

(1) those comprising a combination of an aromatic dicarboxylic acid, an aromatic diol, and an aromatic hydroxycarboxyic acid;
(2) those comprising a combination of different kinds of aromatic hydroxycarboxylic acids;
(3) those comprising a combination of an aromatic dicarboxylic acid and a nuclear-substituted diol; and
(4) those obtainable by the reaction of a polyester such as polyethylene terephthalate with an aromatic hydroxycarboxylic acid;
and preferably forms an anisotropic molten product at a temperature of 400° C. or lower. Further, in place of the aromatic dicarboxylic acid, the aromatic diol, or the aromatic hydroxycarboxylic acid, ester derivatives thereof can be used. The aromatic dicarboxylic acid, the aromatic diol, and the aromatic hydroxycarboxylic acid may have a substituent such as a halogen atom, an alkyl group, an aryl group or the like, on the aromatic group.

Examples of repeating units of the liquid crystal polyester include the following (1) repeating unit derived from aromatic dicarboxylic acid, and (2) repeating unit derived from aromatic diol, without being limited thereto.

(1) Repeating unit derived from aromatic dicarboxylic acid:

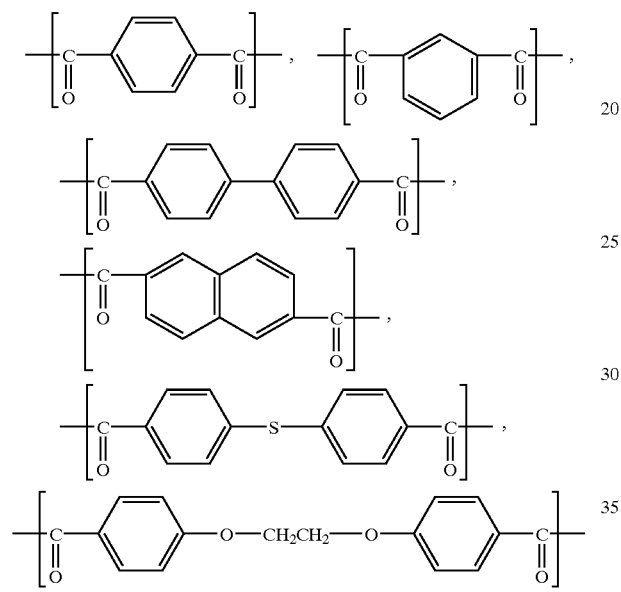

The aromatic ring in each of the above structural unit may be substituted with a halogen atom, an alkyl group, an aryl group or the like.

(2) Repeating unit derived from an aromatic diol:

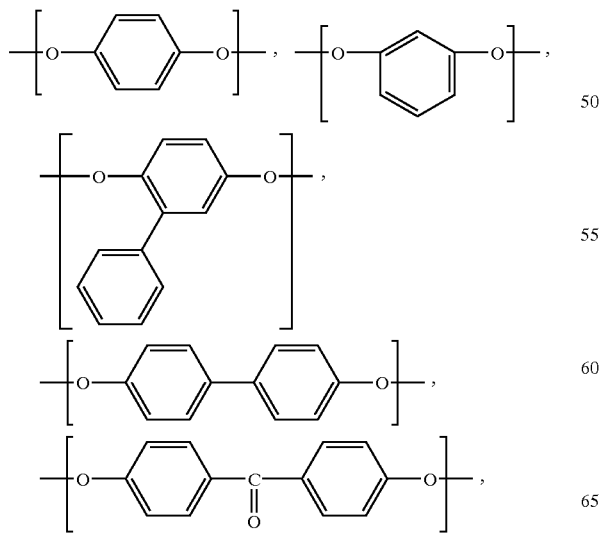

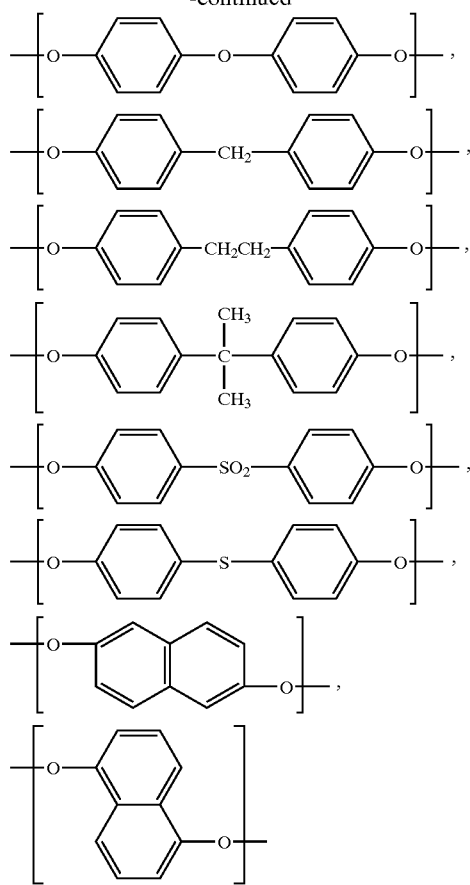

The aromatic ring in each of the above structural unit may be substituted with a halogen atom, an alkyl group, an aryl group or the like.

(3) Repeating unit derived from an aromatic hydroxycarboxylic acid:

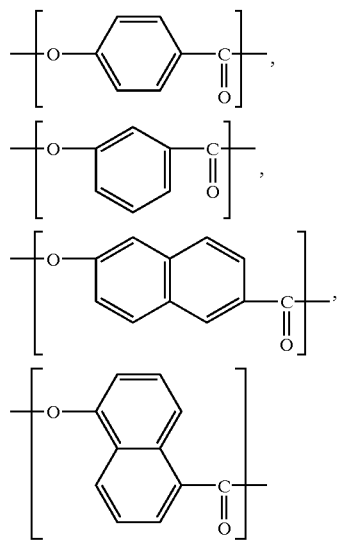

The aromatic ring in each of the above structural unit may be substituted with a halogen atom, an alkyl group, an aryl group or the like.

Liquid crystal polyesters including a repeating unit:

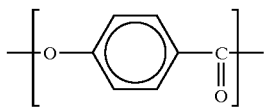

are particularly preferable in heat resistance, mechanical properties, and processability, and those including at least 30 mole % of the repeating unit are further preferable. Specifically, combinations of the repeating units shown as the following (I)–(VI) are suitable. Moreover, the wholly aromatic polyesters other than (IV) is still suitable in view of moisture proof property.

(I)
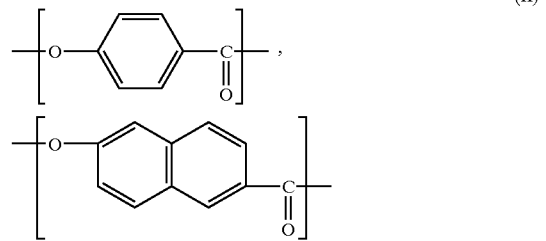

(II)
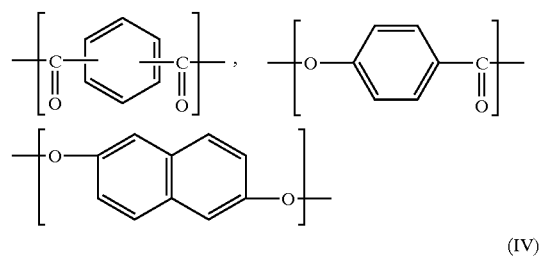

(III)
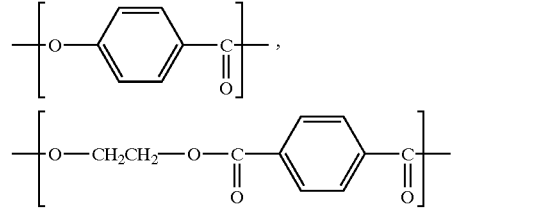

(IV)
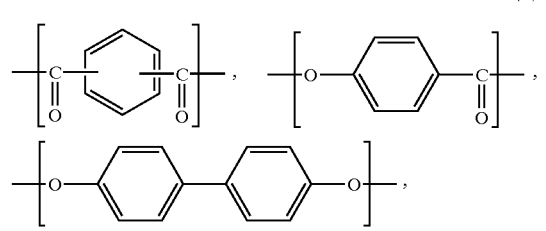

(V)
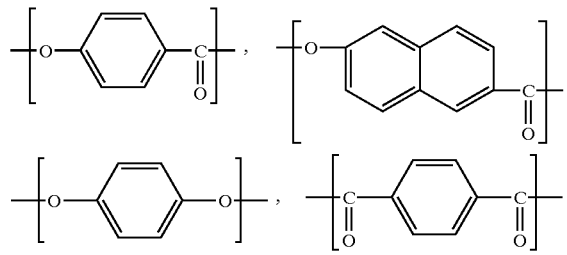

(VI)
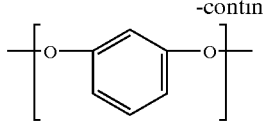

Production method of the above liquid crystal polyesters (I) to (VI) are disclosed in JP-B-47-47870, JP-B-63-3888, JP-B-63-3891, JP-B-56-18016, and JP-A-2-51523. Among these, combinations represented by (I), (II), and (IV) are preferable, and the combinations (I) and (II) are more preferable.

In the present invention, a liquid crystal polyester comprising: 30–80% by mole of repeating unit (a'); 0–10% by mole of repeating unit (b'); 10–25% by mole of repeating unit (c'); and 10–35% by mole of repeating unit (d'); is preferably used for the field where high heat resistance is required.

(a')
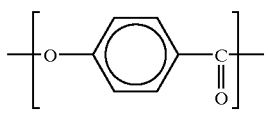

(b')
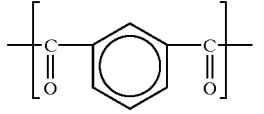

(c')
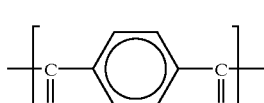

(d')
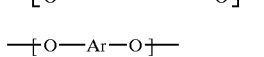

(In the formula, Ar is a divalent aromatic group.)

As the divalent aromatic group of repeating unit (d'), a divalent aromatic group in the above aromatic diol is suitable, and a wholly aromatic diol is preferable for use where especially high heat resistance is required.

In the liquid crystal polyester filler of the present invention, from standpoints such as an environmental problem, in the field required for easy abandonment, such as incineration after use, a liquid crystal polyester constituted with the combination of elements of only carbon, hydrogen and oxygen is used especially preferably, among the suitable combinations required for each fields exemplified so far.

In view of moldability of producing a liquid crystal polymer filler from the film, the liquid crystal polyester composition comprising a liquid crystal polyester (A) as a continuous phase and a copolymer (B) containing a functional group reactive with liquid crystal polyester as a dispersed phase.

The component (B) used for the above liquid crystal polyester resin composition is a copolymer having a functional group reactive with liquid crystal polyester. As such a functional group reactive with liquid crystal polyester, any functional groups can be used as long as it has reactivity with a liquid crystal polyester. Concretely, exemplified are an oxazolyl group, an epoxy group, an amino group, etc., and preferably an epoxy group. The epoxy group etc. may exist as a part of other functional groups, and as such an example, a glycidyl group is exemplified.

In the copolymer (B), as a method of introducing such a functional group into a copolymer, it is not limited especially and can be carry out by the well-known methods. For example, It is possible to introduce a monomer having this functional group by copolymerization in a preparation stage of the copolymer. It is also possible to conduct a graft copolymerization of a monomer having this functional group to a copolymer.

Monomers having a functional group reactive with liquid crystal polyester, especially, monomers containing a glycidyl group are used preferably. As the monomers having a functional group reactive with liquid crystal polyester, an unsaturated glycidyl carboxylate and an unsaturated glycidyl ether represented by the general formula

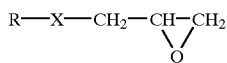

is used suitably.

R is a hydrocarbon group of 2–13 carbons having an ethylenically unsaturated bond, and X is —C(O)O—, —CH$_2$—O— or

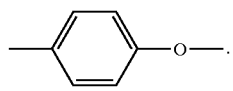

As unsaturated glycidyl carboxylate, exemplified are, for example: glycidyl acrylate, glycidyl methacrylate, itaconic acid diglycidyl ester, butene tri carboxylic acid triglycidyl ester, p-styrene glycidyl carboxylate, etc. As unsaturated glycidyl ether, exemplified are, for example: vinyl glycidyl ether, allyl glycidyl ether, 2-methyl allyl glycidyl ether, methacryl glycidyl ether, styrene-p-glycidyl ether, etc.

As unsaturated glycidyl ether, exemplified are, for example: vinyl glycidyl ether, allyl glycidyl ether, 2-methyl allyl glycidyl ether, methacryl glycidyl ether, styrene-p-glycidyl ether, etc.

The above copolymer (B) having a functional group reactive with liquid crystal polyester, is suitably a copolymer having 0.1 to 30% by weight of a unsaturated glycidyl carboxylate unit and/or a unsaturated glycidyl ether unit.

Suitably, the above copolymer (B) having a functional group reactive with liquid crystal polyester is a copolymer having a heat of fusion of crystal of less than 3 J/g. Moreover, as the copolymer (B), Mooney viscosity is suitably 3–70, more suitably 3–30, and especially suitably 4–25.

Here, Mooney viscosity means the value measured at 100° C. using a large rotor according to JIS K6300.

When it is outside the above ranges, heat stability or flexibility of the composition may deteriorate and it is not preferable.

The above copolymer (B) having a functional group reactive with liquid crystal polyester may be either a thermoplastic resin, a rubber or a composition thereof. Preferable is a rubber which give a molded body such as film or sheet, having excellent heat stability and flexibilty.

As a method of introducing such a functional group reactive with a liquid crystal polyester into a rubber, it is not limited especially and can be carry out by the well-known methods. For example, it is possible to introduce a monomer having the functional group by copolymerization in a preparation stage of the rubber. It is also possible to conduct a graft copolymerization of a monomer having the functional group to a rubber.

Concrete examples of the copolymer (B) having a functional group reactive with liquid crystal polyester, as a rubber having epoxy group, include a copolymer rubber of (meth)acrylate-ethylene-(unsaturated glycidyl carboxylate and/or unsaturated glycidyl ether).

Here, the (meth)acrylate is an ester obtained from an acrylic acid or methacrylic acid and an alcohol. As the alcohol, an alcohol having 1–8 carbons is preferable. Concrete examples of the (meth)acrylates include methyl acrylate, methyl methacrylate, n-butyl acrylate, n-butyl methacrylate, tert-butyl acrylate, tert-butyl methacrylate, 2-ethylhexyl acrylate, 2-ethylhexyl methacrylate, etc. The (meth)acrylates can be used alone or as a mixture of two or more therof.

In the copolymer rubber of the present invention, the (meth)acrylate unit is suitably more than 40 and less than 97% by weight, more suitably 45–70% by weight, the ethylene unit is suitably not less than 3% by weight and less than 50% by weight, more suitably 10–49% by weight, and the unsaturated glycidyl ether unit and/or unsaturated glycidyl ether unit is suitably 0.1–30% by weight, more suitably 0.5–20% by weight.

In case of outside the above range, heat stability and mechanical properties of the obtained molded product, such as film or sheet may become insufficient, and it is not preferable.

The copolymer rubber can be prepared by usual methods, for example, bulk polymerization, emulsion polymerization, solution polymerization, etc. using a free radical initiator. Typical polymerization methods are those described in JP-A-48-11388, JP-A-61-127709, etc., and it can be prepared under the existence of a polymerization initiator which generates a free radical, at the pressure of more than 500 kg/cm$^2$, and the temperature of 40–300° C.

Examples of other rubbers which can be used as copolymer (B) include, an acryl rubber having a functional group reactive with liquid crystal polyester, and a block copolymer rubber of vinyl aromatic hydrocarbon compound-conjugated diene compound having a functional group reactive with liquid crystal polyester.

The acryl rubber here is suitably those having at least one monomer as a main component selected from the compound represented by the general formula (1)

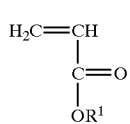

(1)

(in the formula, R$^1$ is an alkyl group or a cyano alkyl group having 1–18 carbon atoms.), the general formula (2)

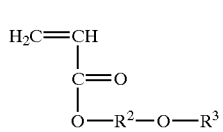

(2)

(in the formula, R$^2$ is an alkylene group having 1–12 carbon atoms, R$^3$ is an alkyl group having 1–12 carbon atoms.), and the general formula (3)

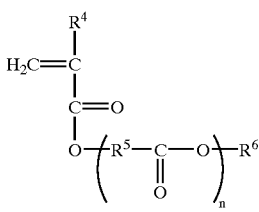

(3)

(in the formula, $R^4$ is a hydrogen atom or methyl group, $R^5$ is an alkylene group having 3–30 carbon atoms, $R^6$ is an alkyl group or derivative thereof having 1–20 carbon atoms, and n is an integer of 1–20.)

Concrete examples of the alkyl acrylate represented by the above general formula (1) include, for example, methyl acrylate, ethyl acrylate, propyl acrylate, butyl acrylate, pentyl acrylate, hexyl acrylate, octyl acrylate, 2-ethylhexyl acrylate, nonyl acrylate, decyl acrylate, dodecyl acrylate, cyanoethyl acrylate, etc.

Moreover, examples of the alkoxyalkyl acrylate represented by the above general formula (2) include, for example, methoxy ethyl acrylate, ethoxy ethyl acrylate, butoxy ethyl acrylate, ethoxy propyl acrylate, etc. These can be used alone or in combination of two or more, as a main component of the acryl rubber.

As a composition component of the acryl rubber, an unsaturated monomer which can be copolymerized with at least one monomer selected from the compounds represented by the above general formulas (1)–(3) can be used, according to requirements.

Examples of such unsaturated monomers include styrene, α-methyl styrene, acrylonitrile, halogenated styrene, methacrylonitrile, acryl amide, methacryl amide, vinyl naphthalene, N-methylol acrylamide, vinyl acetate, vinyl chloride, vinylidene chloride, benzyl acrylate, methacrylic acid, itaconic acid, fumaric acid, maleic acid, etc.

The suitable component ratio of the acryl rubber having a functional group reactive with liquid crystal polyester is 40.0–99.9% by weight of one monomer selected at least from compounds represented by the above general formulas (1)–(3); 0.1–30.0% by weight of unsaturated glycidyl carboxylate and/or unsaturated glycidyl ether; 0.0–30.0 by weight of one monomer which can be copolymerized with the unsaturated monomers selected at least from the compound represented by the above general formula (1)–(3).

If the component ratio of the acryl rubber is within the above range, heat resistance, impact resistance, and mold processing property of the composition are good, and it is preferable.

The preparation process of the acryl rubber is not especially limited, and well known polymerization method described, for example, in JP-A-59-113010, JP-A-62-64809, JP-A-3-160008, or WO 95/04764 can be used. It can be prepared under the existence of a radical initiator, by emulsion polymerization, suspension polymerization, solution polymerization, or the bulk polymerization.

Suitable examples the block copolymer rubber of vinyl aromatic hydrocarbon compound-conjugated diene compound having the above functional group reactive with liquid crystal polyester include: a rubber which is obtained by epoxidization of a block copolymer comprising (a) sequence mainly consisting of vinyl aromatic hydrocarbon compound, and (b) sequence mainly consisting of conjugated diene compound; or a rubber which is obtained by epoxidization of a hydrogenated product of said block copolymer.

Examples of the vinyl aromatic hydrocarbon compound include, for example, styrene, vinyltoluene, divinylbenzene, α-methyl styrene,p-methylstyrene,vinylnaphthalene,etc. Among them, styrene is suitable. Examples of the conjugated diene compound include, for example, butadiene, isoprene, 1,3-pentadiene, 3-butyl-1,3-octadiene, etc. Butadiene and isoprene are suitable.

The block copolymer of vinyl aromatic hydrocarbon compound-conjugated diene compound or the hydrogenated product thereof can be prepared by the well-known methods, for example, as described in JP-B-40-23798, JP-A-59-133203, etc.

As a rubber used as copolymer (B), copolymer rubber of (meth)acrylate-ethylene-(unsaturated glycidylcarboxylate and/or unsaturated glycidylether) is suitably used.

A rubber used as copolymer (B) is vulcanized according to requirements, and it can be used as a vulcanized rubber. Vulcanization of the above copolymer rubber of (meth) acrylate-ethylene-(unsaturated glycidylcarboxylate and/or unsaturated glycidylether) is attained by using a polyfunctional organic carboxylic acid, a polyfunctional amine compound, an imidazole compound, etc., without being limited thereto.

As a concrete example of a copolymer having a functional group reactive with liquid crystal polyester (B), examples of a thermoplastic resin having epoxy group include an epoxy group containing ethylene copolymer comprising: (a) 50–99% by weight of ethylene unit, (b) 0.1–30% by weight of unsaturated glycidylcarboxylate unit and/or unsaturated glycidylether unit, preferably 0.5–20% by weight, and (c) 0–50% by weight of ethylenically unsaturated ester compound unit.

Examples of the ethylenically unsaturated ester compound (c) include vinyl ester of carboxylic acid and alkyl ester of α, β-unsaturated carboxylic acid, etc. such as: vinyl acetate, vinyl propionate, methyl acrylate, ethyl acrylate, butyl acrylate, methyl methacrylate, ethyl methacrylate, and butyl methacrylate. Vinyl acetate, methyl acrylate and ethyl acrylate are especially preferable.

Concrete examples of the epoxy group containing ethylene copolymer include, for example, a copolymer comprising ethylene unit and glycidyl methacrylate unit, a copolymer comprising ethylene unit, glycidyl methacrylate unit and methyl acrylate unit, a copolymer comprising ethylene unit, glycidyl methacrylate unit and ethyl acrylate unit, and a copolymer comprising ethylene unit, glycidyl methacrylate unit and vinyl acetate unit etc.

Melt index (hereinafter referred to as MFR. JIS K6922-2, at 190° C., 2.16kg load) of the epoxy group containing ethylene copolymer is suitably 0.5–100 g/10 minutes, more preferably 2–50 g/10 minutes. Although melt index may be outside this range When the melt index is more than 100 g/10 minutes, it is not preferable in respect to mechanical physical properties of the composition. When the melt index is less than 0.5 g 10 minutes, compatibility of component (A) with a liquid crystal polyester is inferior and it is not preferable.

The epoxy group containing ethylene copolymer has suitably a bending shear modulus of 10–1300 kg/cm$^2$, more suitably 20–1100 kg/cm$^2$. When the bending shear modulus is outside the range, mold processing property and mechanical properties of the composition may become inadequate.

The epoxy group containing ethylene copolymer is manufactured by high pressure radical polymerization method of copolymerizing usually an unsaturated epoxy compound and ethylene, under existence of a radical generating agent, at a pressure of 500 to 4000 atm and at 100–300° C., under existence or un-existing of a suitable solvent and a chain transfer agent. It is manufactured also by a method of conducting molten graft copolymerization in an extruder, mixing an unsaturated epoxy compound and a radical generating agent with polyethylene.

The above liquid crystal polyester resin composition is suitably a resin composition comprising (A) a liquid crystal polyester as continuous phase, and (B) a copolymer having a functional group reactive with liquid crystal polyester as dispersed phase. When liquid crystal polyester is not continuous phase, gas barrier property, heat resistance, etc. of a film comprising the liquid crystal polyester resin composition may fall remarkably.

In the resin composition of the copolymer and the liquid crystal polyester having such a functional group, although details of the mechanism are unknown it is thought that a reaction occurs between components (A) and component (B) in the composition, while component (A) forms continuous phase, component (B) disperses minutely, thus the moldability of the composition is improved.

One embodiment of the above liquid crystal polyester resin composition is a resin composition comprising (A) a liquid crystal polyester of from 90% by weight to less than 100% by weight, suitably from 95% by weight to less than 100% by weight, further suitably 97 to 99.5% by weight, further more suitably 98 to 99% by weight, and (B) a copolymer having a functional group reactive with liquid crystal polyester of from more than 0% by weight to less than 10% by weight, suitably from more than 0% by weight to less than 5% by weight, further suitably 0.5 to 3% by weight, further more suitably 1 to 2% by weight. When component (A) is less than 90% by weight, the obtained liquid crystal polymer filler tends to have less amount of branching, undesirably.

Well-known method can be used as the method of manufacturing such a liquid crystal polyester resin composition. For example, each component is mixed in a solution state, and then evaporating the solvent, or precipitating it in the solvent. From a industrial stand point, a method of melt-kneading each component of the above composition in molten state is suitable. For melt-kneading, currently generally used kneading machines such as an extruder having single or twin screws and various kinds of kneaders, can be used. High kneading machine having twin-screw is especially preferable.

In melt-kneading, the setting temperature of the cylinder of kneading machine is suitably in the range of 200–380° C., more suitably 200–360° C., and further more suitably 230–350° C.

In kneading, each component may be mixed uniformly by a machine such as a tumbling mixer or a Henschel mixer beforehand. A method can be used as well, where each component may be quantitatively supplied separately into a kneading machine, with omitting the previous mixing, if necessary.

To the liquid crystal polymer used for the present invention, various kinds of additives such as organic filler, antioxidant, heat stabilizer, light stabilizer, flame retardant, lubricant, antistatic agent, inorganic or organic colorant, rust preventives, crosslinking agent, foaming agent, fluorescent agent, surface smoothing agent, surface gloss improver, release modifiers such as fluoropolymer, etc., can be further added in the manufacturing process, or the subsequent process according to requirements.

EXAMPLES

The following production examples, examples and comparative examples will describe the present invention further in detail below, without being limited thereto. Measurements and test in examples were carried out according to the following methods.

<Film Thickness>

The film thickness was measured using DIGIMATIC Model MG-4 manufactured by Topro Kikaku K. K. The film thickness was measured at five points on a sample piece of 20 mm×50 mm, and the average value was used as the film thickness.

<BET Specific Surface Area>

The specific surface area was measured by a BET one point method using nitrogen as an adsorption gas by Flow Sorb II2300 manufactured by Shimadzu Corp.

<Method of Measuring Heat Resistance of Film>

Films were placed in a hot air oven kept at 50° C., 100° C., 150° C., 200° C. and 250° C., and taken out every 500 hours from 0 hour to 2500 hours, and kept in a constant temperature and constant humidity room (23° C., 55% RH) for one day, then, tensile strength along the MD direction (according to JIS C2318) was measured, to obtain a curve showing dependency of strength on time. Therefrom, a time at which the strength is half of the strength at 0 hour was judged at each temperature, then, the resulted times (half life) were plotted against temperature, to obtain a curve, and the temperature when the half life is 40000 hours was adopted as a continuously usable heat resistant temperature.

<Freeness>

The freeness was measured using Canadian Freeness Tester manufactured by Kumagaya Riki K. K. according to JIS P8121. 6 g of a completely dried sample was dispersed in 2000 ml of water, and this dispersion was divided into two halves, and the freeness was measured twice, and the average value was used as the measured value.

<Measurement of Breaking Length>

The breaking length was measured according to JIS P8113.

Measurement of Wet Breaking Length After Immersion Into MEK

Paper after heat press was immersed in MEK (methyl ethyl ketone) until the whole body was immersed, left for 2 seconds, then, taken out to measure the tore length.

<Moisture Absorption Rate>

Paper obtained by paper making was thermally dried at 120° C. for 2 hours in a hot air over, and the weight measured at this point was represented by A, and this paper after heating was allowed to stand still in a room kept under constant temperature and constant humidity controlled at 20° C. and 70% RH, and the weight measured after 24 hours was represented by B, and the moisture absorption rate was calculated according to the following formula.

Moisture absorption rate (%)={(B−A)/B}×100

<Form of Filler>

Fillers were photographed by a microscope equipped with a gauge, 10 pieces of fillers were selected in the view, and the longitudinal and transversal lengths were measured and averaged. The thickness was measured by abrading a filler embedded with epoxy and observing the section by an electron microscope.

<Water Vapor Permeability>

Water vapor permeability was measured according to JIS Z0208 (cup method).

Production Example 1
Production of Liquid Crystal Polyester A-1

8.30 kg (60 mol) of p-acetoxybenzoic acid, 2.49 kg (15 mol) of terephthalic acid, 0.83 kg (5 mol) of isophthalic acid and 5.45 kg (20.2 mol) of 4,4'-diacetoxydiphenyl were charged into a polymerization vessel equipped with a stirring blade in the form of comb, and the mixture was heated while stirring under a nitrogen gas atmosphere and polymerized at 330° C. for 1 hour. The polymerization was effected under intense stirring while liquefying an acetic acid gas by-produced during this procedure, and recovering and removing the gas. Thereafter, the system was cooled gradually, and the polymer resulted at 200° C. was removed out of the system. The resulted polymer was ground by a hammer mill manufactured by Hosokawa Micron Corp., to obtain particles of 2.5 mm or less. These were further treated at 280° C. for 3 hours under a nitrogen gas atmosphere in a rotary kiln, to obtain a whole aromatic polyester composed of the following repeating unit, in the form of particle, having a flow initiation temperature of 324° C.

Here, the flow initiation temperature means a temperature (° C.) at which the melt viscosity is 48000 poise when a resin heat-melted at a temperature rising rate of 4° C./min is extruded through a nozzle of an inner diameter of 1 mm and a length of 10 mm under a load of 100 kg/cm$^2$, using a flow tester CFT-500 type manufactured by Shimadzu Corp.

Hereinafter, the resulted liquid crystal polymer is abbreviated as A-1. This A-1 showed optical anisotropy at temperatures of 340° C. or more under pressure.

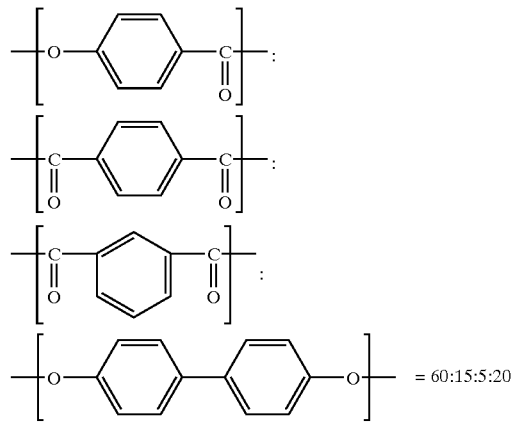

Production Example 2
Production of Rubber, Copolymer (B)

According to a method described in JP-A No. 61-127709, Example 5, rubber of methyl acrylate/ethylene/glycidyl methacrylate=59.0/38.7/2.3 (ratio by weight) having a Mooney viscosity of 15 was obtained. Hereinafter, the resulted liquid crystal polymer is abbreviated as B-1.

Production Example 3
Production of Liquid Crystal Polymer Filler (C)

A-1 produced in Production Example 1 and B-1 produced in Production Example 2 were melt-kneaded at a compounding ratio of A-1:B-1 of 97% by weight: 3% by weight using a twin-screw extruder TEX-30 type manufactured by Japan Steel Works Ltd. at a cylinder setting temperature of 350° C. and a screw revolution of 250 rpm, to obtain a liquid crystal polymer resin composition pellet. This pellet had a flow initiation temperature of 324° C. and showed optical anisotropy at temperatures of 343° C. or more under pressure.

The resulted pellet was melt-extruded by using a single-screw extruder of 60 mmϕ equipped with a cylindrical die at a cylinder setting temperature of 350° C. and a screw revolution of 60 rpm, and the molten resin was extruded toward upper direction from a cylindrical die having a diameter of 50 mm, a lip interval of 1.0 mm and a die setting temperature of 348° C., and dried air was pressed into a hollow portion of the resulted cylindrical film to expand the film, subsequently, the film was cooled, then, passed through nip rolls to give a film. The blow ratio was 1.8 and the draw down ratio was 58, and the actually measured average thickness of the film was 10 μm. Hereinafter, the resulted film exhibiting optical anisotropy in molten state is abbreviated as F-1. F-1 had a common heat resistant temperature of 165° C. The moisture absorption rate was 0.04%.

F-1 was cut by a shredder of which width was controlled to 10 mm, along the direction (hereinafter, this direction may be referred to as TD direction) vertical to the film pulling direction in film formation (hereinafter, this direction may be referred to as MD direction). 100 g of this cut product was dispersed in 2000 g of water. Subsequently, the disk interval of KRK high concentration disk refiner manufactured by Kumagaya Riki was controlled 0 mm, and the interval was enlarged from this position, to control the read value of a cavity distance meter to 0.12 mm, and this dispersed sample was passed through this five times for beating. Thereafter, the sample was dried, to obtain a filler G-1. The resulted G-1 was observed with a microscope, to find a trunk part in flattened form and branchings in the form of fibril extending from the trunk part, and the measured specific surface area was 0.8 m$^2$/g. However, the thickness of a thick part was about 10 μm, reflecting to the film thickness. The freeness was 750 ml.

This dispersed sample was passed through this ten times for beating, and dried, to obtain a filler G-2. The resulted G-2 was observed with a microscope, to find a trunk part in the form of flat plate and branching in the form of fibril extending from the trunk part, and the measured specific surface area was 1.4 m$^2$/g. However, the thickness of a thick part was about 10 μm, reflecting to the film thickness. The freeness was 726 ml.

Example 1

G-1 and commercially available aramid pulp (Twaron 1094, manufactured by AKZO Novel: specific surface area, 4.55 m$^2$/g; freeness, 683 ml; moisture absorption rate, 4.5%) were mixed at a weight ratio of 50:50, and this mixed product was subjected to paper making at 50 g/m$^2$, to obtain composite paper. This composite paper had a breaking length of 0.15 Km, and after this composite paper was heat-pressed at 360° C. and 100 kg/cm$^2$, to obtain heat resistant paper. The breaking length of this was 1.05 Km. The breaking length after immersion in MEK was 0.91 Km. The moisture absorption rate was 1.6%. The value was less than that expected from additivity of the raw materials (4.5%×50/100+0.04×50/100=2.27%), which shows excellent low hygroscopicity.

Comparative Example 1

The same procedure was conducted as in Example 1 except that the heat press temperature was 350° C. The breaking length of this heat resistant paper was 1.00 Km. The breaking length after immersion into MEK was 0.89 Km. The moisture absorption rate was 2.3%, which was as the same level with that expected from additivity of the raw materials.

Comparative Example 2

Commercially available aramid pulp (Twaron 1094, manufactured by AKZO Novel) was used alone and subjected to paper making at 50 g/m², to obtain aramid paper. The breaking length of this aramid paper was 0.41 Km, and after this paper was heat-pressed at 350° C. and 100 kg/cm², the breaking length was 0.66 Km. The breaking length after immersion in MEK was 0.54 Km. The moisture absorption rate was 4.5%.

Example 2

G-2 and commercially available aramid pulp (Twaron 1094, manufactured by AKZO Novel) were mixed at a weight ratio of 50:50, and this mixed product was subjected to paper making at 50 g/m², to obtain composite paper. This composite paper had a breaking length of 0.19 Km, and after this composite paper was heat-pressed at 370° C. and 100 kg/cm², to obtain heat resistant paper. The breaking length of this was 1.20 Km. The breaking length after immersion in MEK was 0.96 Km. The moisture absorption rate was 0.9%. The value was less than that expected from additivity of the raw materials (4.5%×50/100+0.04×50/100=2.27%), which shows excellent low hygroscopicity.

Example 3

2000 g of a polycarbonate (grade name: 200-20) manufactured by Sumitomo Dow K. K. and 200 g of G-1 obtained in Production Example 3 were melt-kneaded by using a PCM twin-screw kneading extruder at a cylinder temperature of 280° C. and a screw revolution of 150 rpm, to obtain a liquid crystal polycarbonate resin composition pellet. This pellet was processed by a press machine set at 300° C. to make a sheet, and this sheet showed a water vapor permeability of 9.0 g/m²·24 hr.

Comparative Example 4

A substance in the form of sheet was obtained in the same manner as in Example 3 except that G-1 was not added. This sheet had a water vapor permeability of 11.4 g/m²·24 hr.

According to the present invention, low hygroscopic paper in which hygroscopicity arising from raw materials is reduced can be provided, by heat-pressing composite paper comprising a liquid crystal polymer and a pulp component and/or fiber component, at a specific temperature higher than the flow initiation temperature of the liquid crystal polymer by 30° C. or more. Particularly, since low hygroscopic paper having remarkably low hygroscopicity is obtained even from raw materials having high hygroscopicity, for example, polyamide, it is further advantageous to use a raw material having high hygroscopicity. Low hygroscopic paper obtained from polyamide not only has remarkably low hygroscopicity, but also excellent in strength and heat resistance, and can be used as substrate paper such as a prepreg and the like used particularly in electric and electronic circuit boards. Moreover, the liquid crystal polymer filler has excellent dispersibility with other resin, and also has improved gas barrier property. Furthermore, when a thin paper-like molded body is produced, the problems of projections and extraneous materials and the like can be dissolved.

What is claimed is:

1. Low hygroscopic paper obtained by heat-pressing composite paper which comprises a pulp component and/or fiber component and, a liquid crystal polymer filler component made of a liquid crystal polymer exhibiting optical anisotropy in molten state, at a temperature higher than the flow initiation temperature of said liquid crystal polymer by 30° C. or more.

2. The low hygroscopic paper according to claim 1, wherein the composite paper is made from a paper material comprising a pulp component and/or fiber component and, a liquid crystal polymer filler component made of a liquid crystal polymer exhibiting optical anisotropy in molten state.

3. The low hygroscopic paper according to claim 1 or 2, wherein the pulp content and/or fiber component has a moisture absorption rate of over 0.3%.

4. The low hygroscopic paper according to claim 1, wherein the liquid crystal polymer filler is contained in an amount of 1% by weight or more and less than 60% by weight based on the total amount of the liquid crystal polymer filler and the pulp component and/or fiber component.

5. The low hygroscopic paper according to claim 1, wherein the liquid crystal polymer filler has a trunk part in the form of flat plate and a specific surface area of from 0.01 to 2.5 m²/g.

6. The low hygroscopic paper according to claim 1, wherein the liquid crystal polymer filler is obtained by pulverizing a film-shaped form made of a liquid crystal polymer exhibiting optical anisotropy in molten state.

7. The low hygroscopic paper according to claim 6, wherein the film-shaped form is obtained by inflation film-forming a liquid crystal polymer exhibiting optical anisotropy in molten state.

8. The low hygroscopic paper according to claim 1, wherein the liquid crystal polymer exhibiting optical anisotropy in molten state is a liquid crystal polyester.

9. The low hygroscopic paper according to claim 1, wherein the liquid crystal polymer exhibiting optical anisotropy in molten state is a liquid crystal polyester resin composition comprising a liquid crystal polyester (A) as a continuous phase and a copolymer (B) containing a functional group reactive with liquid crystal polyester as a dispersed phase.

10. The low hygroscopic paper according to claim 9 wherein the liquid crystal polyester resin composition is obtained by melt-kneading the liquid crystal polyester (A) from 90% by weight to less than 100% by weight and the copolymer (B) containing a functional group reactive with liquid crystal polyester from more than 0% by weight and less than 10% by weight.

11. The low hygroscopic paper according to claim 1, wherein the pulp and/or fiber content comprises at least one selected from aromatic polyamide, nylon, aromatic polyimide, aromatic polyamideimide and cellulose.

12. A prepreg obtained by using the low hygroscopic paper according to claim 1.

13. A method of producing low hygroscopic paper in which a composite paper comprising a pulp component and/or fiber component and, a liquid crystal polymer filler component made of a liquid crystal polymer exhibiting optical anisotropy in molten state is heat-pressed at a temperature higher than the flow initiation temperature of said liquid crystal polymer by 30° C. or more.

14. A method of reducing the moisture absorption rate of paper in which a composite paper comprising a pulp component and/or fiber component and, a liquid crystal polymer filler component made of a liquid crystal polymer exhibiting optical anisotropy in molten state is heat-pressed at a temperature higher than the flow initiation temperature of said liquid crystal polymer by 30° C. or more.

* * * * *